United States Patent
Khafizov et al.

(10) Patent No.: US 10,114,503 B1
(45) Date of Patent: *Oct. 30, 2018

(54) METHOD AND APPARATUS FOR PROCESSING DATA BASED ON TOUCH EVENTS ON A TOUCH SENSITIVE DEVICE

(71) Applicant: OPEN INVENTION NETWORK LLC, Durham, NC (US)

(72) Inventors: Farid Khafizov, Plano, TX (US); Margarita Khafizova, Plano, TX (US)

(73) Assignee: Open Invention Network LLC, Durham, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 15/290,724

(22) Filed: Oct. 11, 2016

Related U.S. Application Data

(63) Continuation of application No. 13/454,564, filed on Apr. 24, 2012, now Pat. No. 9,465,577, which is a continuation of application No. 13/053,662, filed on Mar. 22, 2011, now Pat. No. 9,798,518.

(60) Provisional application No. 61/352,892, filed on Jun. 9, 2010, provisional application No. 61/317,744, filed on Mar. 26, 2010.

(51) Int. Cl.
*G06F 7/00* (2006.01)
*G06F 17/30* (2006.01)
*G06F 3/041* (2006.01)
*G06F 3/0488* (2013.01)

(52) U.S. Cl.
CPC ........ *G06F 3/0416* (2013.01); *G06F 3/04883* (2013.01); *G06F 2203/04105* (2013.01)

(58) Field of Classification Search
None
See application file for complete search history.

(56) References Cited

U.S. PATENT DOCUMENTS

| | | | | |
|---|---|---|---|---|
| 7,254,775 | B2 * | 8/2007 | Geaghan | G06F 3/0416 178/18.01 |
| 8,140,421 | B1 * | 3/2012 | Humphries | G06Q 20/10 705/313 |
| 8,510,349 | B1 * | 8/2013 | Puttick | G06F 17/30463 707/805 |
| 8,515,839 | B2 * | 8/2013 | Ma | G06Q 30/0278 705/35 |
| 8,676,680 | B2 * | 3/2014 | Humphries | G06Q 30/02 705/35 |
| 2003/0063073 | A1 * | 4/2003 | Geaghan | G06F 3/0416 345/173 |
| 2007/0097084 | A1 * | 5/2007 | Niijima | B60K 35/00 345/173 |
| 2007/0143312 | A1 * | 6/2007 | Wiseman | G06F 17/30867 |

(Continued)

*Primary Examiner* — Tuan A Pham

(57) ABSTRACT

A touch sensitive device is configured to determine commands based on a plurality of touch events on the touch sensitive device. At least a first predetermined number of touch events is detected on the touch sensitive device. At least a second predetermined number of control points is determined based on the detected at least first predetermined number of touch events. A command is determined based on a change in value of at least one parameter related to at least two of the control points. A first data object and a second data object are processed based on a preselected common attribute tag using the determined command.

17 Claims, 15 Drawing Sheets

(56) References Cited

U.S. PATENT DOCUMENTS

| | | | |
|---|---|---|---|
| 2007/0185727 A1* | 8/2007 | Ma | G06Q 30/0278 705/306 |
| 2010/0044121 A1* | 2/2010 | Simon | G06F 3/03547 178/18.03 |

* cited by examiner

```xml
<?xml version="1.0" encoding="ISO-8859-1" ?>
<HOME4SALE >
    <REC>13526</REC>
    <DATE_LISTED>04.07.2009</DATE_LISTED>
    <YEARBUILT>1992</ YEARBUILT >
    <STORIES>2</ STORIES >
    <SQFOOTAGE>1950</ SQFOOTAGE >
    <ASKING_PRICE>295,000</ ASKING_PRICE >
    <BEDROOMS>
        <BDR>20</BDR >
        <BDR>18</BDR >
        <BDR>22</BDR >
    </BEDROOMS >
    <STUDY>0</ STUDY >
    <SCHOOLS>
        <ELEM_SCHOOL>Garret</ELEM_SCHOOL >
        <MIDDLE_SCHOOL>Pines</MIDDLE_SCHOOL >
        <HIGH_SCHOOL>Medows</HIGH_SCHOOL >
        <SRHIGH_SCHOOL>East</SRHIGH_SCHOOL >
    </SCHOOLS >
    <RESIDENT>
        <FIRSTNAME>John</FIRSTNAME>
        <MIDDLENAME>Joe</MIDDLENAME>
        <LASTNAME>Smith</LASTNAME>
        <RESIDENT>
    <ADDRESS>
        <STREET> Main </ STREET >
        <NUMBER> 1280 </NUMBER>
        <CITY> Richardson </CITY>
        <ZIP>72003</ZIP>
        <COUNTY>Dallas</COUNTY>
        <COUNTRY>USA</COUNTRY>
    </ADDRESS>
    <APPLIANCES>
        <DISHWASHER> GE/2001 </ DISHWASHER >
        <WASHER> MayTag/2003 </ WASHER >
        <DRYER> MayTag/2003 </ DRYER >
        <WATER_HEATER> GE/1999 </ WATER_HEATER >
        <OVEN>GE/1999</OVEN>
    </ APPLIANCES >
</ HOME4SALE >
```

Fig. 2C

METHOD AND APPARATUS FOR PROCESSING DATA BASED ON TOUCH EVENTS ON A TOUCH SENSITIVE DEVICE

CROSS REFERENCE TO RELATED APPLICATIONS

This application is a continuation of and claims priority to U.S. application Ser. No. 13/454,564, entitled "METHOD AND APPARATUS FOR PROCESSING DATA BASED ON TOUCH EVENTS ON A TOUCH SENSITIVE DEVICE" as filed on Apr. 24, 2012, issued as U.S. Pat. No. 9,465,577 on Oct. 11, 2016, which is a continuation of U.S. application Ser. No. 13/053,662 entitled "METHOD AND APPARATUS FOR PROCESSING DATA BASED ON TOUCH EVENTS ON A TOUCH SENSITIVE DEVICE" as filed on Mar. 22, 2011, which in turn claims priority from U.S. Provisional application Ser. No. 61/317,744 entitled "Touch Screen Commands" as filed on Mar. 26, 2010 and U.S. Provisional application Ser. No. 61/352,892 entitled "Touch Screen Commands" as filed on Jun. 9, 2010. The above applications are incorporated herein by reference.

FIELD OF THE INVENTION

The disclosed embodiments relate generally to electronic devices with touch screen displays, and more particularly, to a method and apparatus for determining commands based on a plurality of touch events on a touch sensitive device.

BACKGROUND OF THE INVENTION

User interface (UI) is often one of the most important parts of a computer program because it determines how easily a user can communicate with the program. A powerful program with a poorly designed UI has little value. Text-based and graphical user interfaces (GUIs) that use windows, icons, and pop-up menus have become standard on personal computers. Text-based UIs as well as GUIs typically use an input device, such as a keyboard, mouse or stylus, to provide user input and control the movement of a cursor or pointer on a display screen.

Touch-sensitive surfaces are rapidly becoming more common in computing devices. A natural input device for computing devices with touch-sensitive surfaces is user's finger. They are very convenient as they allow a user to make natural gestures familiar to the user in other contexts, such as by entering handwriting using a stylus. Many of these devices also allow input to be provided by a user's fingertip. The term touch-sensitive surface or device will be used herein to refer to such surfaces or devices that are configured to detect the touch of any type of "stylus" such as a stylus, stylus type device or a user's finger, fingers, hand or hands.

As portable electronic devices become more compact, and the number of functions performed by a given device increase, it has become a significant challenge to design a user interface that allows users to easily interact with various devices including multifunction devices. This challenge is particularly significant for handheld portable devices, which have much smaller screens than desktop or laptop computers. This situation is unfortunate because the user interface is the gateway through which users receive not only content but also responds to user actions or behaviors, including user attempts to access a device's features, tools, and functions. Some portable communication devices (e.g., PDAs, mobile telephones, sometimes called mobile phones, cell phones, cellular telephones, smart phones, and the like) have resorted to adding more pushbuttons, increasing the density of push buttons, overloading the functions of pushbuttons, or using complex menu systems to allow a user to access, store and manipulate data. These conventional user interfaces often result in complicated key sequences and menu hierarchies that must be memorized and accessed by the user.

Many conventional user interfaces, such as those that include physical pushbuttons, are also inflexible. This may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

To avoid problems associated with pushbuttons and complex menu systems, portable electronic devices may use touch screen displays that detect user gestures on the touch screen and translate detected gestures into commands to be performed. However, user gestures may be imprecise; a particular gesture may only roughly correspond to a desired command. Other devices with touch screen displays, such as desktop computers with touch screen displays, also may have difficulties translating imprecise gestures into desired commands.

Accordingly, there is a need for touch screen display electronic devices with more transparent and intuitive user interfaces for translating imprecise user gestures into precise, intended commands that are easy to use, configure, and/or adapt. Such interfaces increase the effectiveness, efficiency and user satisfaction with portable multifunction devices. The need to elaborate methods of touch screen device user's gesture recognition and flexible touch commands has been recognized in both industry and academia. Numerous inventions have been reported in that area. For example, in the U.S. Pat. No. 7,519,223 "Recognizing gestures and using gestures for interacting with software applications" by Dehlin et al, an interactive display table is described that senses and infers natural hand or finger positions, or movement of an object, to detect gestures. Specific gestures are used to execute applications, carry out functions in an application, create a virtual object, or do other interactions, each of which is associated with a different gesture.

Other solutions, including a U.S. Pat. No. 7,479,949 "Touch screen device, method, and graphical user interface for determining commands by applying heuristics" by Jobs et al, assigned to Apple Inc., are also attempting to address this problem. U.S. Pat. No. 7,479,949 covers many touch screen commands related to the use of iPhone. Inventions of that patent are based on detecting one or more finger contacts with the touch screen display, applying one or more heuristics to the one or more finger contacts to determine a command for the touch screen device, and processing the command.

As more software applications are being implemented on computing system with touch screen interface, it is clear that any set of similar applications may require specific interpretation of touch commands and gestures recognized by touch sensitive devices. In other words, the same gestures or touch commands may mean different things for different applications. Moreover, new touch commands and gestures will be implemented as touch screen devices gain more popularity. While many commands exist already (as is seen from the above mentioned examples), there is a need to have better and more intuitive commands for specific applications. These commands will help to eliminate push buttons and "drop down" interfaces that use up space on a touch screen. Clearly such commands provide significant benefit to devices with small touch screen. In this invention we describe a system that utilizes a set of new touch commands. We also describe a method by which these commands can be correctly detected and interpreted. As will be seen later, these commands are naturally linked to certain data processing operations illustrated in the preferred embodiment.

We illustrate these commands' usage in data processing applications where each data unit has structured content identified by an appropriate tag (e.g., as in XML documents). Specific example of a data used for illustration purposes is a description of a real estate property for sale. We will call such description a data record. Clearly there are many such data records, and often a potential buyer (user) wants to analyze two or more of such records. Invented commands implemented on a system with a touch screen interface greatly improve the process of analyzing such data.

What is also needed is a system that can understand simple and intuitive user gestures and can interpret them as appropriate touch screen commands that allow the user to align, sort, view commonality or difference of multiple data records. The system would also be displaying on a touch screen resulting operation on selected data records according to a tag associated with data records. The tag could be related to time, location, distance, or any specific attribute (e.g., number of bedrooms for the data records describing homes for sale), etc. Applications taking advantage of such commands will be disclosed in embodiments below. Such applications include but are not limited to analysis of any structured data records such as real estate records, quarterly sales report of a retail store, description of new/used cars for sale, etc. Any person skilled in the art will recognize that the touch screen commands presented in this invention can be used in many other applications.

Therefore, present invention disclosure describes a computing device with a touch screen display that is able to recognize new touch screen commands improving usability of the above mentioned applications.

SUMMARY OF THE INVENTION

Certain aspects of the present disclosure provide a method for analyzing data records using a touch screen interface. The method generally includes detecting at least a first predetermined number of touch events on the touch sensitive device, determining at least a second predetermined number of control points based on the detected at least first predetermined number of touch events, determining a command based on a change in value of at least one parameter related to at least two of the control points and processing a first data object and a second data object based on a preselected common attribute tag using the determined command.

Certain aspects of the present disclosure provide an apparatus for analyzing data records using a touch screen interface. The apparatus generally includes at least one processor and a memory coupled to the at least one processor. The processor is generally configured to detect at least a first predetermined number of touch events on the touch sensitive device, determine at least a second predetermined number of control points based on the detected at least first predetermined number of touch events, determine a command based on a change in value of at least one parameter related to at least two of the control points and process a first data object and a second data object based on a preselected common attribute tag using the determined command.

Certain aspects of the present disclosure provide a computer-program product for analyzing data records using a touch screen interface, the computer-program product generally including a computer-readable medium comprising code for detecting at least a first predetermined number of touch events on the touch sensitive device, determining at least a second predetermined number of control points based on the detected at least first predetermined number of touch events, determining a command based on a change in value of at least one parameter related to at least two of the control points and processing a first data object and a second data object based on a preselected common attribute tag using the determined command.

BRIEF DESCRIPTION OF THE DRAWINGS

FIG. 2C illustrates an example of XML based data record for a home for sale in accordance certain aspects of the present disclosure.

Figure 1:
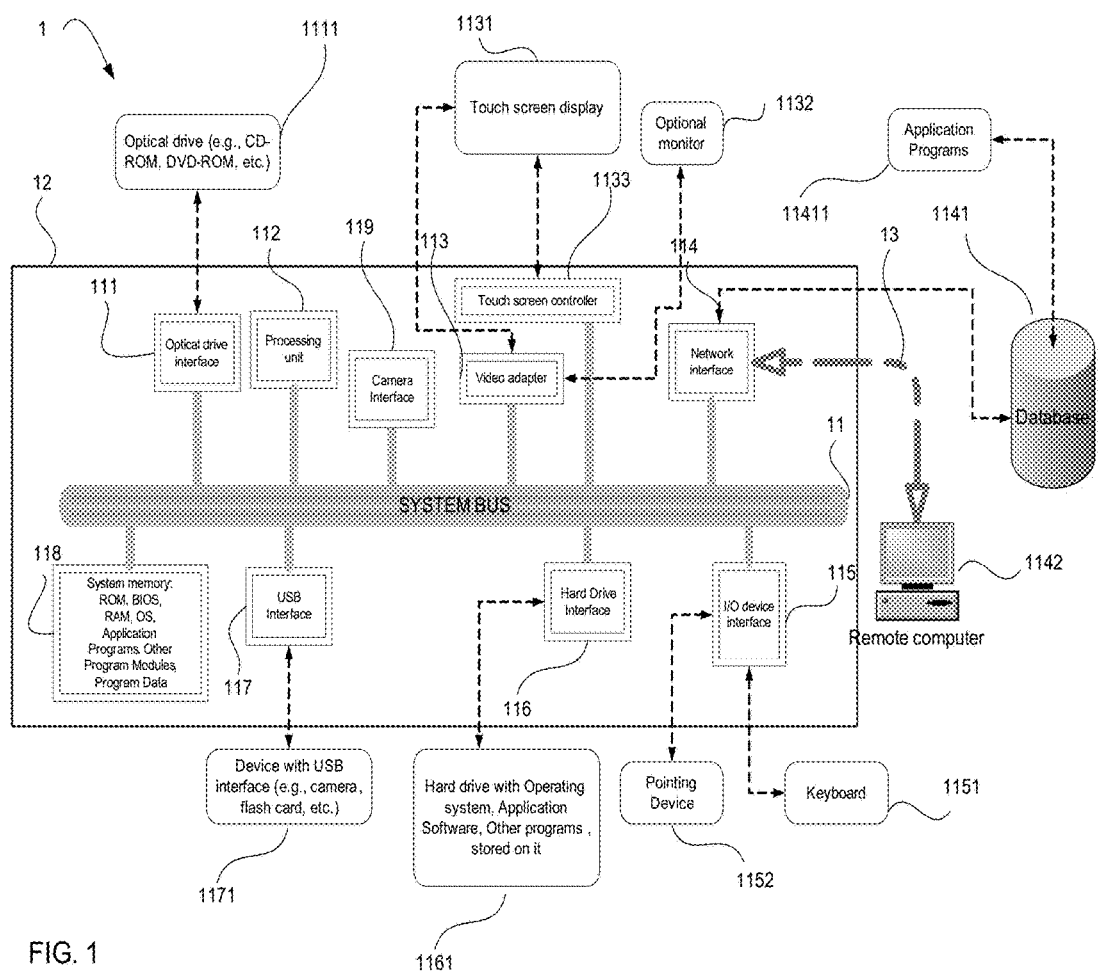
FIG. 1 illustrates a functional block diagram of a conventional computing device or personal computer that is suitable for analysis of data records in connection with the interactive di splay table.

The foregoing summary, as well as the following detailed description of certain embodiments of the present invention, will be better understood when read in conjunction with the appended drawings. The drawings illustrate diagrams of the functional blocks of various embodiments. The functional blocks are not necessarily indicative of the division between hardware circuitry. Thus, for example, one or more of the functional blocks (e.g., processors or memories) may be implemented in a single piece of hardware (e.g., a general purpose signal processor or a block or random access memory, hard disk, or the like). Similarly, the programs may be stand alone programs, may be incorporated as subroutines in an operating system, may be functions in an installed imaging software package, and the like. It should be understood that the various embodiments are not limited to the arrangements and instrumentality shown in the drawings.

DETAILED DESCRIPTION

Aspects of the present invention can be used in connection with a computing device including a touch screen. With reference to FIG. 1, an exemplary system 1 suitable for implementing various portions of the present invention is shown. The system includes a general purpose computing device in the form of a conventional computer (PC) 12, provided with a processing unit 112, a system memory 118, and a system bus 11. The system bus couples various system components including the system memory to processing unit 112 and may be any of several types of bus structures, including a memory bus or memory controller, a peripheral bus, and a local bus using any of a variety of bus architectures. The system memory includes read only memory (ROM) and random access memory (RAM). A basic input/output system (BIOS), containing the basic routines that help to transfer information between elements within the PC 12, such as during start up, is stored in ROM. The PC 12 further includes a hard disk drive 1161 for reading from and writing to a hard disk (not shown), an optical disk drive 1111 for reading from or writing to a removable optical disk, such as a compact disk-read only memory (CD-ROM) or other optical media. Hard disk drive 1161 and optical disk drive 1111 are connected to system bus 11 by a hard disk drive interface 116 and an optical disk drive interface 111, respectively. The drives and their associated computer readable media provide nonvolatile storage of computer readable machine instructions, data structures, program modules, and other data for PC 12. Although the exemplary environment described herein employs a hard disk and removable optical disk, it will be appreciated by those skilled in the art that other types of computer readable media, which can store data and machine instructions that are accessible by a computer, such as magnetic disks, magnetic cassettes, flash memory cards, digital video disks (DVDs), Bernoulli cartridges, RAMs, ROMs, and the like, may also be used in the exemplary operating environment.

A number of program modules may be stored on the hard disk, optical disk, ROM, or RAM, including an operating system, one or more application programs, other program modules, and program data. A user may enter commands and information via the PC 12 and provide control input through input devices, such as a keyboard 1151 or a pointing device 1152. Pointing device 1152 may include a mouse, stylus, wireless remote control, or other pointer, but in connection with the present invention, such conventional pointing devices may be omitted, since the user can employ the touch sensitive interactive display for input and control. As used hereinafter, the term "mouse" is intended to encompass virtually any pointing device that is useful for controlling the position of a cursor on the screen. Other input devices (not shown) may include a microphone, joystick, haptic joystick, yoke, foot pedals, game pad, satellite dish, scanner, or the like. These and other input/output (I/O) devices are often connected to processing unit 112 through an I/O interface 115 that is coupled to the system bus 11. The term I/O interface is intended to encompass each interface specifically used for a serial port, a parallel port, a game port, a keyboard port, and/or a universal serial bus (USB).

Figure 2A:
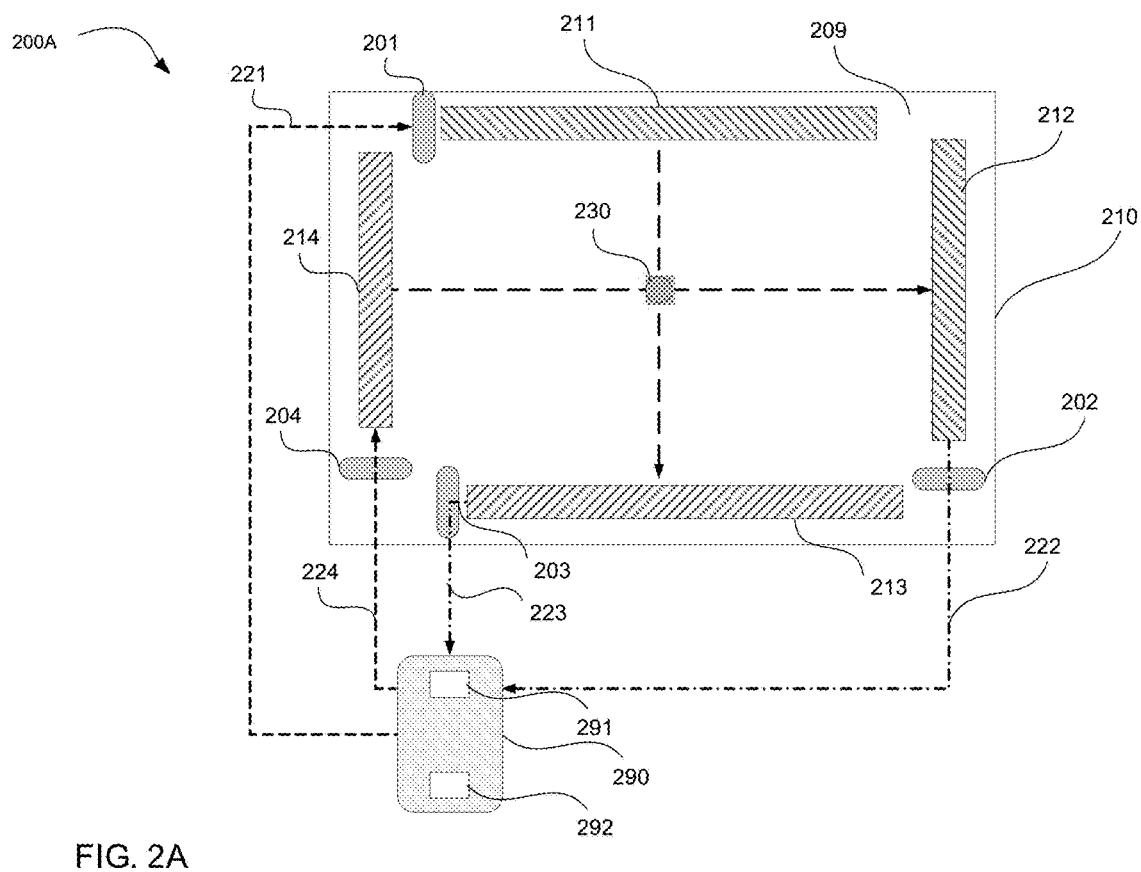
FIG. 2A illustrates a system with a touch screen capable of detecting touch events in accordance certain aspects of the present disclosure.

System bus 11 is also connected to a camera interface 119. The digital video camera may be instead coupled to an appropriate serial I/O port, such as to a USB port. Optionally, a monitor 1132 can be connected to system bus 11 via an appropriate interface, such as a video adapter 113; however, the touch screen display 1131 of the present invention can provide a much richer experience for the user and interact with the user for input of information and control of software applications and is therefore preferably coupled to the video adaptor. The touch screen display 1131 is communicatively coupled to a touch sensor and controller 1133. Touch sensor and controller can be combined in one block 1131 or they can be separate communicatively coupled blocks as is illustrated in FIG. 2A below. It should be noted that the touch screen display 1131 and the touch screen sensor and controller 1133 can be enclosed into a single device as well. User interface can be implemented through the optional monitor 1132 coupled with the touch sensor and controller 1133 though the video adapter 113 or directly via internet, wireless, or another connection. It will be appreciated that PCs are often coupled to other peripheral output devices (not shown), such as speakers (through a sound card or other audio interface—not shown) and printers.

The present invention may be practiced on a single machine, although PC 12 can also operate in a networked environment using logical connections to one or more remote computers, such as a remote computer 1142. Remote computer 1142 may be another PC, a server (which can be configured much like PC 12), a router, a network PC, a peer device, or a satellite or other common network node, and typically includes many or all of the elements described above in connection with PC 12. The logical connection 13 depicted in FIG. 1 can be a local area network (LAN) or a wide area network (WAN). Such networking environments are common in offices, enterprise wide computer networks, intranets, and the Internet.

When used in a LAN networking environment, PC 12 is connected to a LAN through a network interface or adapter 114. When used in a WAN networking environment, PC 12 typically includes a modem (not shown), or other means such as a cable modem, Digital Subscriber Line (DSL) interface, or an Integrated Service Digital Network (ISDN)

interface for establishing communications over WAN, such as the Internet. The modem, which may be internal or external, is connected to the system bus 11 or coupled to the bus via I/O device interface 115, i.e., through a serial port. In a networked environment, program modules, or portions thereof, used by PC 12 may be stored in the remote memory storage device. It will be appreciated that the network connections shown are exemplary and other means of establishing a communications link between the computers may be used, such as wireless communication and wide band network links.

Figure FIG. 2A illustrates a touch input system 200A implementing touch sensor and controller functionality and touch detection operation using as an example an acoustic wave touch input system. Acoustic wave technology uses ultrasonic waves that pass over the touch screen panel. When the panel is touched, a portion of the wave is absorbed. This change in the ultrasonic waves registers the position of the touch event and sends this information to the controller for processing. It should be noted that choice of acoustic wave technology does not limit present invention to acoustic wave technology only; it is used for illustrative purposes only.

In FIG. 2A, a transparent sensor layer 210 having a surface 209 covers a screen of a display system. The wave energy is directed along one or more paths that form an invisible grid overlaying the surface 209 wherein a touch to the surface 209 causes wave energy to be attenuated. Four transducers, two sending (201 and 204) and two receiving (202 and 203), are shown in FIG. 2A. A transducer is a device that converts acoustic wave energy to electrical signal for measurement and information transfer purposes (i.e., enables pressure sensor). All four transducers 201, 202, 203 and 204 may be, for example, piezoelectric transducers and are located in the corners of the sensor layer 210. It should be noted that the choice of transducers types includes but is not limited to piezoelectric (as in the example above), electromagnetic, electrochemical, electromechanical, electro-acoustic, photoelectric, electrostatic, thermoelectric, radio-acoustic.

The touch sensor system 200 is configured to respond to a touch on the touch-screen 210 by causing acoustic waves to be transmitted across the touch-screen 209, one or more of which are modulated in the presence of the touch. The controller 290 in turn uses the modulated signal from the waves to identify the location of the touch on the touch-screen 209. Basic operation of the touch sensor system 200 in FIG. 2A is as follows. The controller 290 begins the scan process to continuously monitor the touch screen 210 for touch events. For example, the controller 290 may send a signal to the first sending transducer 201 via line 221. The sending transducer 201 sends acoustic waves in the horizontal direction. Acoustic waves are partially reflected by reflector arrays 211 and 213, and then are received by the receiving transducer 203. The receiving transducer 203 sends a returning signal via line 223 to the controller 290. The controller 290 then sends a signal to the second sending transducer 204 via line 224. The sending transducer 204 sends acoustic waves in the vertical direction. Acoustic ways are partially reflected by reflector arrays 214 and 212, and then are received by the receiving transducer 202. The second receiving transducer 202 sends a second returning signal via line 222 to the controller 290. The returning signal includes timing and signal amplitude information representative of touch events, if present. Therefore, controller 290 constantly sends and receives signals in both the horizontal and vertical directions in order to detect the coordinates of one or more touch events. The time between the repetitive propagation of waves is the sampling rate or time. A measurement period may be determined as the time period to send and receive the first and second sets of signals.

Figure 2B:
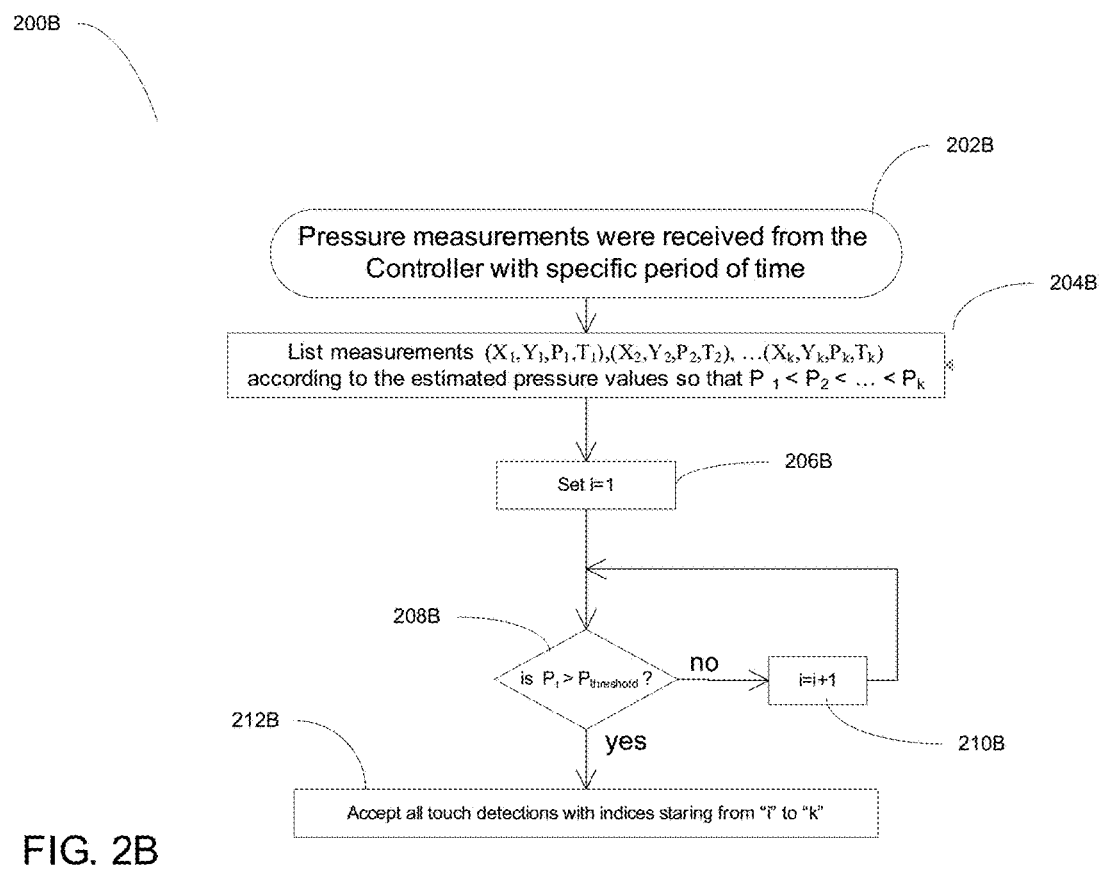
FIG. 2B is a flow chart illustrating the process of comparing touch pressure measurements to a pre-configured threshold value in accordance certain aspects of the present disclosure.

The controller 290 also uses the modulated signal to distinguish between valid touches and invalid signals (e.g., signals generated by contamination on the surface of the screen). One way of distinguishing valid touch from a non-valid is to compare measured touch pressure with a pre-configured threshold, as is illustrated in FIG. 2B. If the controller 290 identifies a touch as valid, it transmits the touch's location to a host computer (not shown) that then implements a corresponding computer function to display the pertinent information, e.g., graphics, on the display device 210. Graphics or other information such as new widows, menu, text files, etc. may be displayed on the display device 210 in response to an operator's command, e.g. touching a particular area of the touch-screen 209.

The controller 290 sends signals to the sending transducers 201 and 204 through communication channels 221 and 224, respectively, and the transducers 201 and 204 generate acoustic energy that is sent across the sensor layer 210 and reflected by the reflector arrays. The controller 290 accepts signals from the receiving transducers 202 and 203 through communication channels 222 and 223, respectively, and the received signals include timing and signal.

The controller 290 comprises coded instructions (stored, for example, in a memory of a microprocessor), which when executed, perform steps to control and process the relevant (sent and received) signals. The controller 290 need not comprise a computer, but may be implemented in hardware, firmware, software or any combination thereof. The controller has coded instructions to calculate the time the wave takes to travel from the sending transducers 201 and 204 to the receiving transducers 202 and 203 via the reflector arrays 211, 213, 214 and 212 is dependent on the path length, and therefore the position of an attenuation within the wave can be correlated to the time at which it was received relative to the time it was launched. Waves are periodically and/or repetitively propagated in both the horizontal and vertical directions of the sensor layer 210 in order to allow the detection of coordinates of a touch event location 230.

When user of the system touches sensor layer 210 at any point of the surface, during a relative time of the touch event, touch location and pressure value are detected by the controller. In many systems, touch events with low touch pressure are generally ignored. The decision is made by the controller and generally depends on the minimum pressure threshold value stored in the controller as a fixed or configurable parameter (see FIG. 2B). In this disclosure we will discuss only valid touch commands, i.e. the ones where allied pressure was no lower than the detection threshold. For example, if we say mention touches <X,Y,T> with coordinates (X,Y) at time T, it will be implicitly understood that these are valid touch measurements detected by the controller.

FIG. 2B is a flow chart 200B illustrating the process of comparing touch pressure measurements to a pre-configured threshold value in accordance certain aspects of the present disclosure. At 202b pressure measurements are received from the controller with specific period of time. At 204b, the measurements are listed according to the estimated pressure values in the ascending order of pressures. At 206b, i is initialized to one. At 208b, if $P_i > P_{threshold}$, all touch detections are accepted with indices started from i to k.

In order to illustrate invented touch commands we will assume that we have multiple data records such as description of real estate properties, e.g., homes for sale with multiple attributes. We will also assume that these data records are well-formatted, which means that they all have the same format and similar attributed are properly tagged. Tags could be implemented as in XML or similar markup language. Example of a simple XML based data record of a home for sale is presented in FIG. 2C below. Such data records may be retrieved from data bases of realtors or constructed by the user over period of time. Example of a data retrieval method based on a touch screen device is given in FIG. 3A.

Figure 3A:
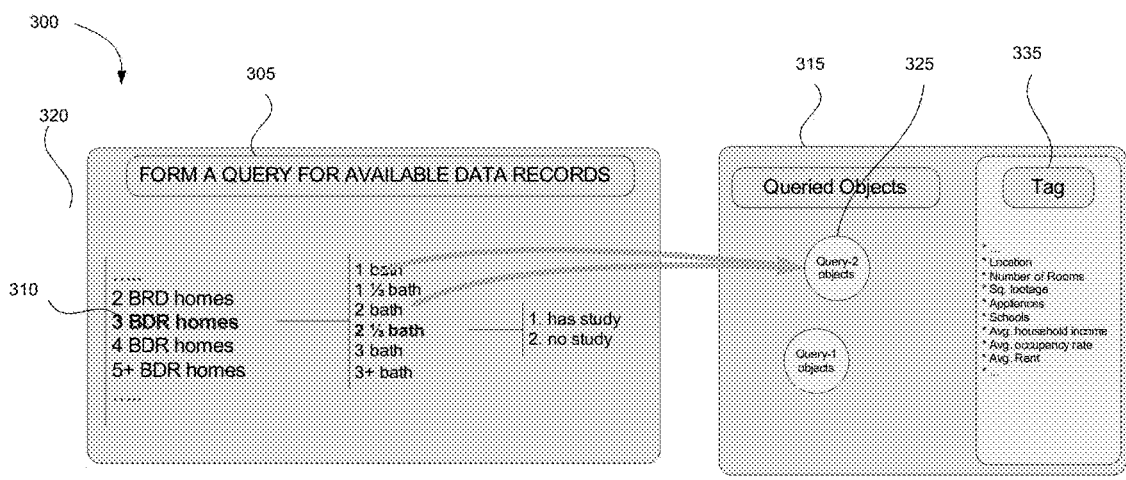
FIG. 3A illustrates selection of a set of data records in accordance certain aspects of the present disclosure.
Figure 3B:
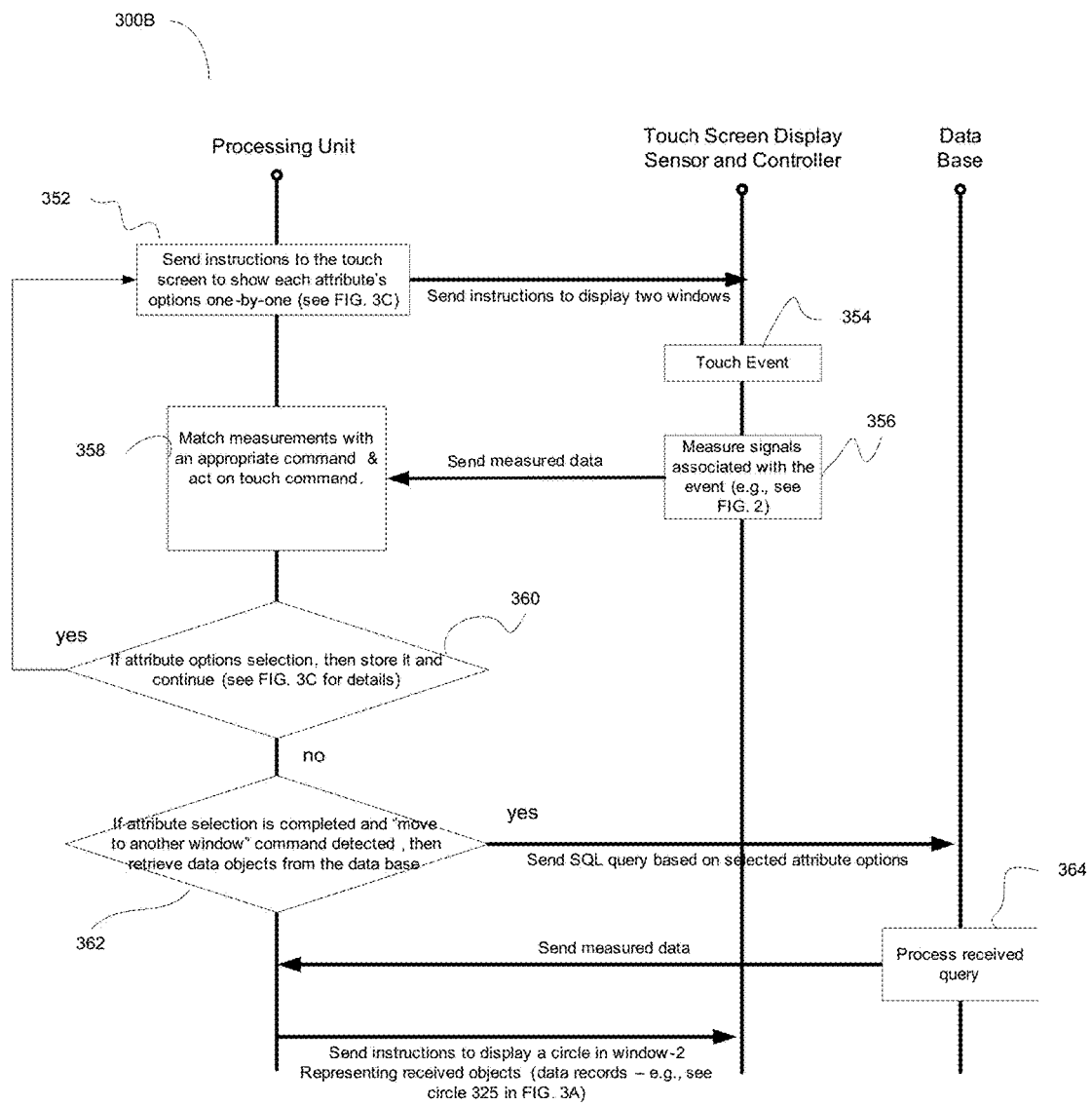
FIG. 3B is a high level interaction diagram illustrating main functionality and message exchange between the processing unit, touch screen with touch sensor and controller, and the data base in accordance certain aspects of the present disclosure.
Figure 3C:
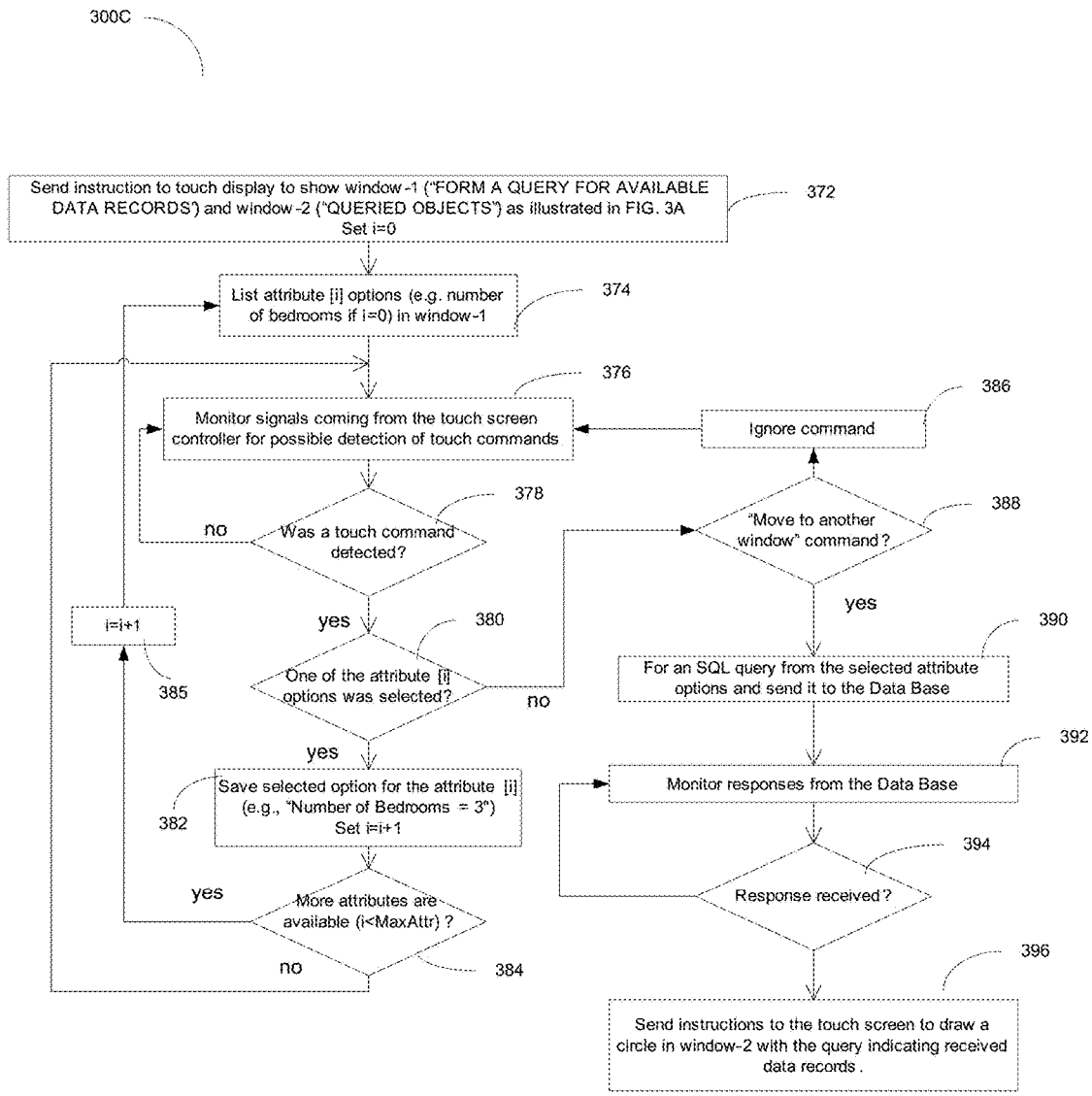
FIG. 3C is a flow chart illustrating the process of data records' selection based on queries formed from data record attributes selected via touch commands in accordance certain aspects of the present disclosure.

FIG. 3A illustrates a system 300 and method of forming queries to the database and selecting desired data records as well as selecting a tag of desired attribute on a touch screen device. The method illustrated in FIG. 3A, is the result of program running on the processing unit 112 (see FIG. 1) and interacting with programs running on other modules such as touch screen display 1131, touch sensor & controller 1133, database 1141. The interaction is on the high level as illustrated in FIG. 3B below. FIG. 3C is a flow chart of the attribute selection and data records retrieval process executed by the processing unit.

Program running on the processing unit 112 (see FIG. 1) sends instructions to the touch screen display 1131 via video adapter 113 to list possible options for the first attribute. In our example, when the data records are descriptions of homes for sale, the first attribute can be number of bedrooms. This scenario is illustrated in FIG. 3A: in window 305 the system displays a list 310 of options for the number of bedrooms. That list will be followed by various alternative attributes (e.g., number of bathrooms, study availability, etc.) of homes available on the market. When the user finger 320 touches a desired option in the first attribute (e.g, the number of bedrooms), the system saves the selected option (e.g., NUMBER OF BEDROOMS=3 in FIG. 3A) in the memory 118 and opens another list of alternative attributes (number of bathrooms), etc. In addition to these attributes the list of attributes includes but is not limited to price range, square footage range, number of stories, garage size, etc. The process continues until the list of attributes is exhausted or the user is satisfied with the list of specified attributes (please refer to FIG. 3C for the detailed description of the algorithm). For example, in FIG. 3A the user wants to look at all homes with 3 bedrooms and 2½ bathrooms. In order to form a query and retrieve data records for all such homes the user would move his finger from the last selected attribute option (e.g., 2½ bath) to the next window 315. Upon detecting such command instruction from the measurements received by the software running on the processing unit 112 from the touch sensor and controller 1133, the processing unit 112 forms a query based on attribute options selected by the user (e.g., "BedRooms=3 AND BathRooms=2½") and sends it to the data base 1141.

The database 1141 upon receiving the query retrieves all the data records matching the query and sends them back to the processing unit 112. In another embodiment, the data base 1141 returns only specified subset of each of the full data records. For example if the user is interested only in elementary and middle schools assigned to each of the selected homes, only those attributes will be returned. The processing unit 112 will inform the database of the desired set of attributes at the same time when a query is sent.

Once the data objects are received, the processing unit 112 sends instructions to the touch screen display to show a circle 325 in window 315 indicating (e.g., by putting a sign "query-2 objects" inside the circle 325) that query-2 data is available for analysis. The user can make several queries selecting homes if he desires so.

FIG. 3B is a high level interaction diagram 300B illustrating main functionality and message exchange between the processing unit, touch screen with touch sensor and controller, and the data base in accordance with certain aspects of the present disclosure. At 352, the processing unit sends instructions to the touch screen display to show each attribute's options one by one. The instructions typically direct the touch screen display to display two windows. A touch event occurs at 354. The signals associated with the touch event are measured at 356 and the measured data is sent to the processing unit. At 358, the processing unit matches the measurements with an appropriate command. At 360, if a matched command indicates an attribute option selection, then the attribute selection is stored and the processing unit sends instructions to the touch screen display to display the selection. On the other hand if the attribute selection is completed at 362 and a "move to another window" command is detected, then a query based on the selected attribute options is sent to the data base for the retrieval of data objects. The query is processed in the database at 364 and the results of processing the query (data objects) is sent back to the processing unit. The processing unit in turn sends instructions to the touch screen display device to display a circle in the second window representing the received data object(s).

FIG. 3C is a flow chart illustrating the process 300C of data records' selection based on queries formed from data record attributes selected via touch commands in accordance with certain aspects of the disclosure. At 372, instructions are sent to the touch screen display to show window 1 for "forming a query for available data records" and window 2 for "queried objects". At 374, i attribute options are listed in window 1. At 376, signals coming from the touch screen controller are monitored for possible detection of touch commands. At 378, if a touch command is detected process proceeds to 380. If not, process goes back to 376 to continue monitoring signals from the touch screen controller. At 380, if one of the attributes is selected process proceeds to 382 where selection option for attribute is saved. At 384, if there are more attributes available for selection i is incremented by 1 at 385 and the process goes back to 374 to list the new set of attributes. If not, process goes back to monitoring signals from the touch screen controller. At 380, if one of the attribute options was not selected process proceeds to 388. At 388, if "move to another window command" is detected, an SQL query is formed based on the selected attribute options and sent to the data base at 390. At 392, responses from the database are monitored. At 394, if a response is received from the database instructions are sent to the touch screen display at 396 to draw a circle in window 2 with the query indicating received data records. If a response is not detected at 394, monitoring of responses from the database is continued at 392. At 388, if the "move to another window" command is not detected then the command is ignored at 386 and the process goes back to 376 for monitoring signals coming from the touch screen controller.

Once all the desired data objects are retrieved, the user can select the tag of the attribute by which he wants to compare the selected data records. Tag selection is done in the Tag sub-window 335 by touching the desired option. Tags can include but are not limited to attributes of data objects. For example, if the data objects are records of homes available for sale, tag's list can include location, number of bedrooms, square footage, appliances, etc. It should be noted that since the format of data records is known to the application, creating tag list does not require any exchange of information with the Base Station. However, it is possible that data format is updated from time to time, and new and extended attributes are available for analysis of data records. Therefore, in other embodiments of the invention full list of attributes can being exchanges between the nodes of the system. For example, in one embodiment, before the data object selection process begins, the processing unit 112 will send a full list of attributes known to the system to the database to send the latest list of attributes used for describing data objects. If there are differences in the lists of attributes know to the database 1141 and the processing unit, the database 1141 will inform the processing unit 112. In another embodiment, the data base 1141 sends a message to the main processing unit 112 every time format of data records is changed. In another embodiment the processing unit will infer automatically from parsing at least one full data record sent by the database 1141 in response to the query described in FIG. 3C. In that last embodiment, the system will be able to use extended list of attributes during the next data records selection process.

Figure 4:
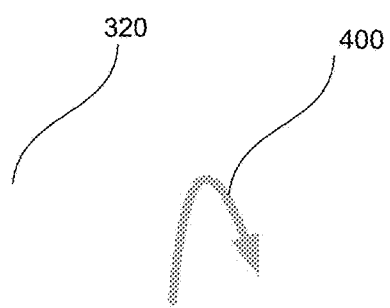
FIG. 4 illustrates "INTERSECTION", a touch command for analysis of selected data records in accordance certain aspects of the present disclosure.
Figure 4A:
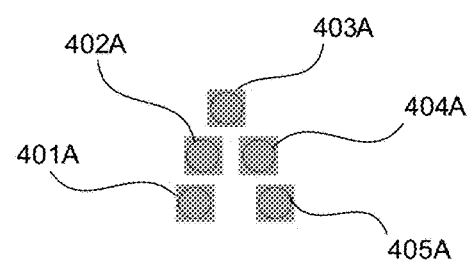
FIG. 4A illustrates sample touch events used for detecting "INTERSECTION" touch command in accordance certain aspects of the present disclosure.

Once the set of desired data records and the attribute tag are specified, the user can apply one of the invented touch commands for comparing data records. The following commands are described below: INTERSECTION, UNION, DIFFERENCE, SHOW ALL, DESCENDING SORT, and ASCENDING SORT. For example, the INTERSECTION touch command may be invoked by the user's finger moving up and then down forming upside down 'U' or upside down 'V', as is shown in FIG. 4. Please note that the detailed description of how the user actions are understood by the system and how the system provides proper response are explained in below and are illustrated in flow charts in FIG. 9, FIG. 10, and FIG. 11. FIG. 4A shows an example of touch measurements detected by the controller that correspond to the INTERSECTION command. Proper detection procedure will be described later.

Figure 5:
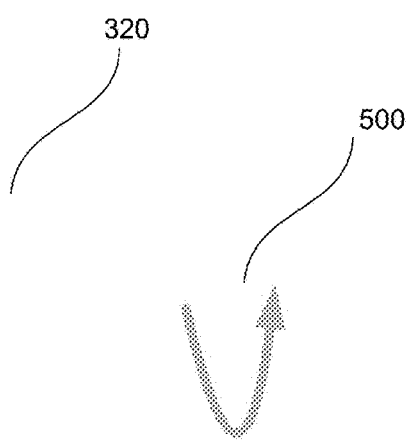
FIG. 5 illustrates "UNION", a touch command for analysis of selected data records in accordance certain aspects of the present disclosure.
Figure 5A:
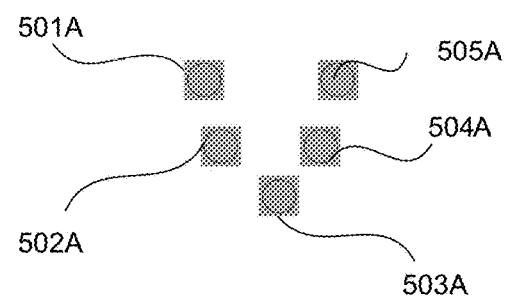
FIG. 5A illustrates sample touch events used for detecting "UNION" touch command in accordance certain aspects of the present disclosure.

INTERSECTION command applied to data records of homes for sale with selected attribute tag="Schools", will check if there are elementary, middle, high, or senior high schools common for all data records. If the intersection is not empty, the common school name will be displayed on the screen. For example, in the example used above, if all the selected data records for homes with three bedrooms and 2½ bathrooms have same High and Senior High Schools, but elementary and middles schools are not the same for all, the output for the intersection command will be messages
"All selected homes have the same High School=Medow"
"All selected homes have the same Sr. High School=East"
Similarly the UNION command combines all the schools and display the list of all schools applicable to the selected homes on the screen. The UNION command is invoked by user's finger moving down and then up forming 'U' or 'V'-like shape as can be seen in FIG. 5. FIG. 5A shows an example of touch measurements detected by the controller that correspond to the UNION command.

In the UNION list each school is listed only once. For example, in the example used above, if all the selected data records for homes with three bedrooms and 2½ bathrooms have same High and Senior High Schools, but elementary and middles schools are not the same for all, the output for the intersection command will be messages
"Elementary Schools for the selected homes are: Garret, Harrington, Mathews" "Middle Schools for the selected homes are: Rice, Pines" "High Schools for the selected homes are: Meadow" "Sr. High Schools for the selected homes are: East"

Figure 6:
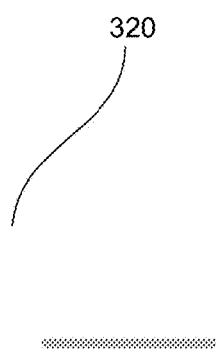
FIG. 6 illustrates "DIFFERENCE", a touch command for analysis of selected data records in accordance certain aspects of the present disclosure.
Figure 6A:
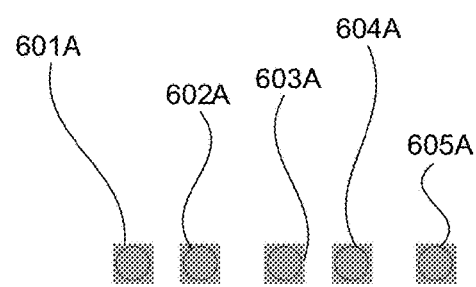
FIG. 6A illustrates sample touch events used for detecting "DIFFERENCE" touch command in accordance certain aspects of the present disclosure.

The difference between UNION command and SHOW ALL command, shown in FIG. 6 and FIG. 6A, is that schools will be listed per each data record, therefore the result may include the same school listed more than once.

For two data records, the DIFFERENCE touch command is used if the user wants to see the difference in the information stored under the selected tag. For example, if the user selects two individual homes and want to compare their appliances, he can select appliances tag. The result of the DIFFERENCE command will be an output that illustrates difference in appliances. For example, if all the appliances are the same except the washer and dryer, the system will display the following message:

|  | Differences in appliance for: | |
| --- | --- | --- |
|  | Home-1 | Home-2 |
| Washer | GE/2001 | Maytag/1998 |
| Dryer | GE/2001 | Maytag/2000 |

Figure 7:
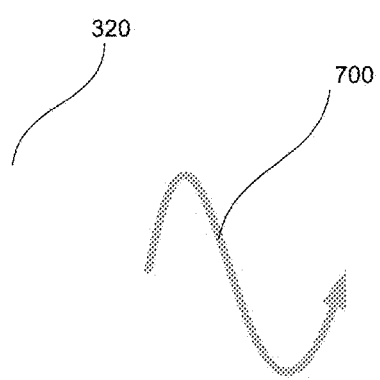
FIG. 7 illustrates "SHOW ALL", a touch command for analysis of selected data records in accordance certain aspects of the present disclosure.
Figure 7A:
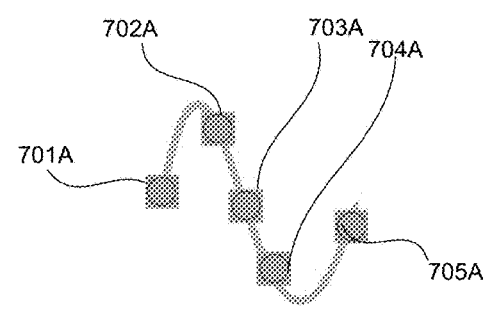
FIG. 7A illustrates sample touch events used for detecting "SHOW ALL" touch command in accordance certain aspects of the present disclosure.

The DIFFERENCE command is invoked by user's finger moving up, then down and then up again as can be seen in FIG. 7. FIG. 7A shows an example of touch measurements detected by the controller that correspond to the DIFFERENCE command. Proper detection procedure is described below and is illustrated by flow charts in FIG. 9 and FIG. 10. This command is useful, for example, if the user wants to compare the difference in appliances listed for each of the two homes being compared. In that case, Appliances tag would have to be selected prior to the execution of DIFFERENCE touch command.

Figure 8:
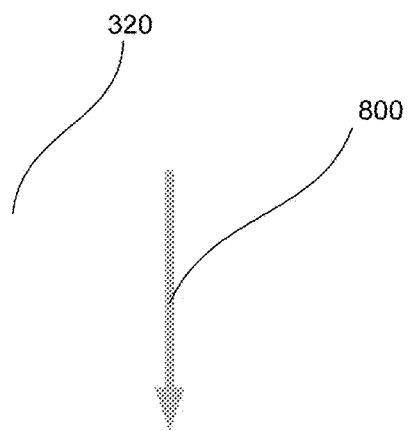
FIG. 8 illustrates "DESCENDING SORT", a touch command for analysis of selected data records in accordance certain aspects of the present disclosure.
Figure 8A:
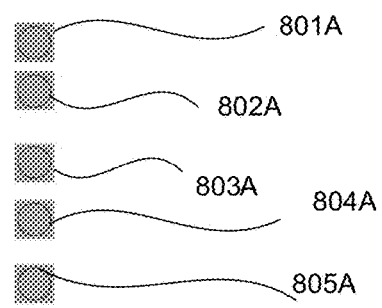
FIG. 8A illustrates sample touch events used for detecting "DESCENDING SORT" touch command in accordance certain aspects of the present disclosure.

Finally the last touch commands described in present invention are ASCENDING SORT and DESCENDING SORT. The latter is illustrated in FIG. 8 and FIG. 8A. These commands are applicable to certain attributes that can be sorted numerically (e.g., home price, distance from the nearest hospital, etc.) or lexicographically (e.g., home builder name, etc.). For example, if the user selects homes with 3 bedrooms and 2½ bathroom and then wants to sort them according their square footage in descending order, he can execute the DESCENDING SORT command, and the system will list all the selected homes along with the square footage in descending order.

The invented command recognition method requires at least five touch measurements for each of the invented commands. Typically touch sensor and controller will detect more than five measurements for each of the touch commands movements illustrated in FIG. 4, FIG. 5, FIG. 6, FIG. 7, and FIG. 8. The minimum five detected measurements required are illustrated in respective FIG. 4A, FIG. 5A, FIG. 6A, FIG. 7A, and FIG. 8A. If touch command movement result is less than five measurements, the command will treated as invalid. As was mentioned earlier there are several touch detection technologies. This invention assumes acoustic touch detection technology is utilized in the described embodiments. Please refer to "Repetitive touch combining method" invention disclosure for the detailed description of a possible implementation of (acoustic) touch detection technology. Touch detection done by the controller is based on the coordinates and timestamp of the touch measurements. The procedure of reducing total number of touches detected during the invented touch commands to five, and correct interpretation of the invented commands from those five touch measurements is illustrated by a flowcharts in FIG. 9 and FIG. 10 and explained in detail below.

If more than five touch measurements $<X_i,Y_i,T_i>$ are detected within pre-configured time $T_c$, touch measurements sample size is reduced to five measurements $C_j$ as follows. Let $<X_1,Y_1,T_1>$, $<X_2,Y_2,T_2>$, ..., $<X_k,Y_k,T_k>$ be valid touch measurements detected by the controller within time interval $T_c$. We can assume that $T_1<T_2<\ldots<T_k$. We define $C_1=<X_1,Y_1,T_1>$, $C_2=<Xp_2,Yp_2,Tp_2>$, $C_3=<Xp_3,Yp_3,Tp_3>$, $C_4=<Xp_4,Yp_4,Tp_4>$, and $C_5=<X_k,Y_k,T_k>$, where $$p_3 = \left\lfloor \frac{k+1}{2} \right\rfloor, \ p_1 = \left\lfloor \frac{p_3+1}{2} \right\rfloor, \text{ and } p_4 = \left\lfloor \frac{p_3+k}{2} \right\rfloor.$$

Analysis of the coordinates of the selected five valid measurements $C_1, \ldots, C_5$, allows proper detection of the above listed commands. For example the INTERSECTION command is detected if x-coordinates for measurements $C_i$ are staggered while $Y_1<Yp_3$ and $Yp_3>Y_k$. Likewise, UNION COMMAND is detected if $Y_1>Yp_3$ and $Yp_3<Y_k$. The DIFFERENCE touch command is detected if $Y_1<Yp_2>Yp_3>Yp_4<Y_k$. These and other procedures (for the remaining commands) are illustrated in the flow chart shown in FIG. 9 and FIG. 10.

Figure 9:
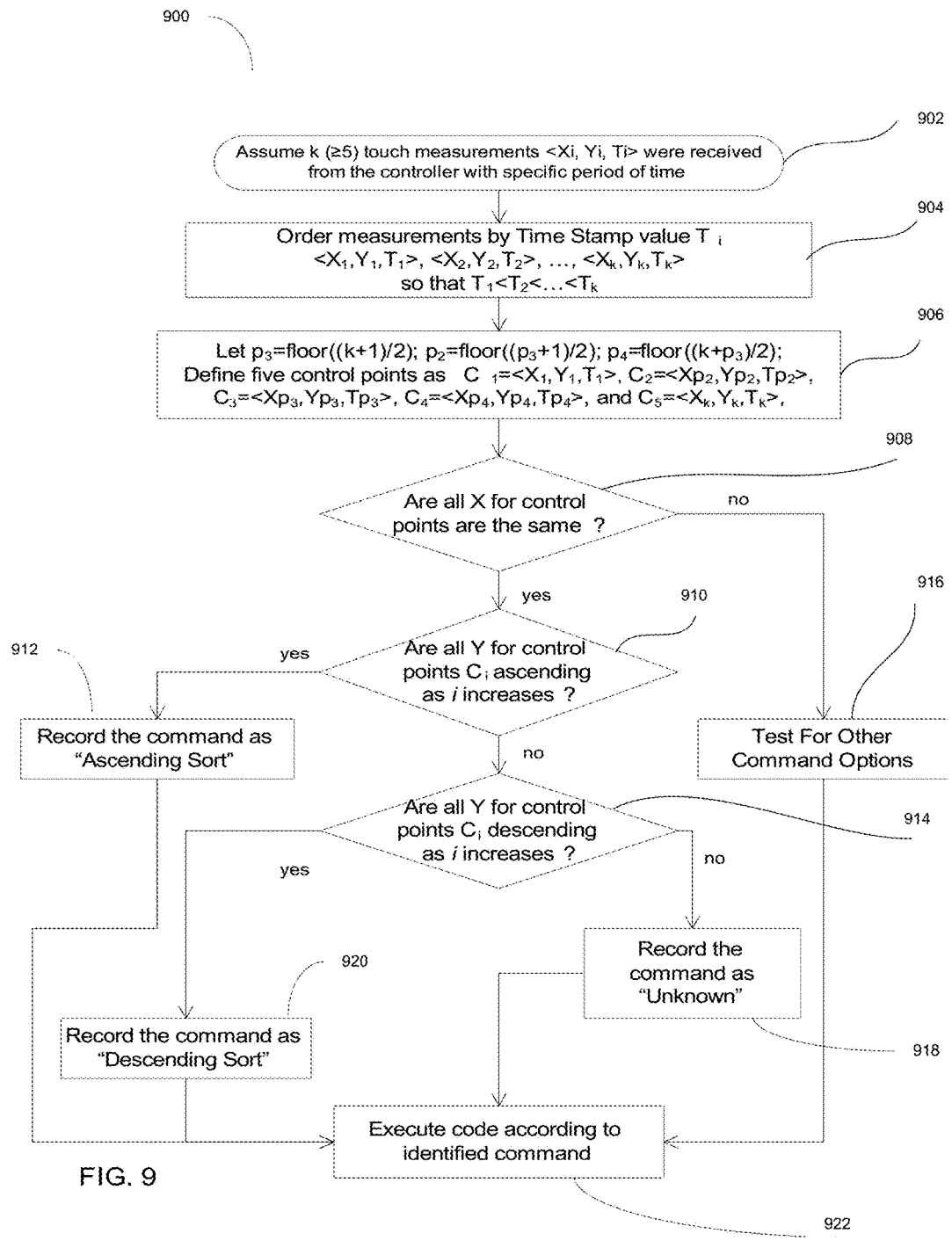
FIG. 9 is a flow chart illustrating the process of detection of invented touch commands in accordance certain aspects of the present disclosure.

FIG. 9 is a flow chart 900 illustrating the process of detection of invented touch commands in accordance with certain aspects of the disclosure. At 902, it is assumed that greater than or equal to five measurements were received from the controller with specific period of time. At 904, the measurements received from the controller are ordered by their time stamp values. At 906, five control points are defined as illustrated in the figure. At 908, if all X for control points are same process proceeds to 910. At 910, if all Y for control points $C_i$ are ascending as i increases, the command is recorded as "Ascending Sort" at 912. If not, process proceeds to 914 where if all Y for control points $C_i$ are descending as i increases, the command is recorded as "Descending Sort" at 920. If not, the command is recorded as "Unknown" at 918. At 908, if all X for control points are not the same, a test is conducted for other command options at 916. Finally at 922, code is executed according to the identified command.

Figure 10:
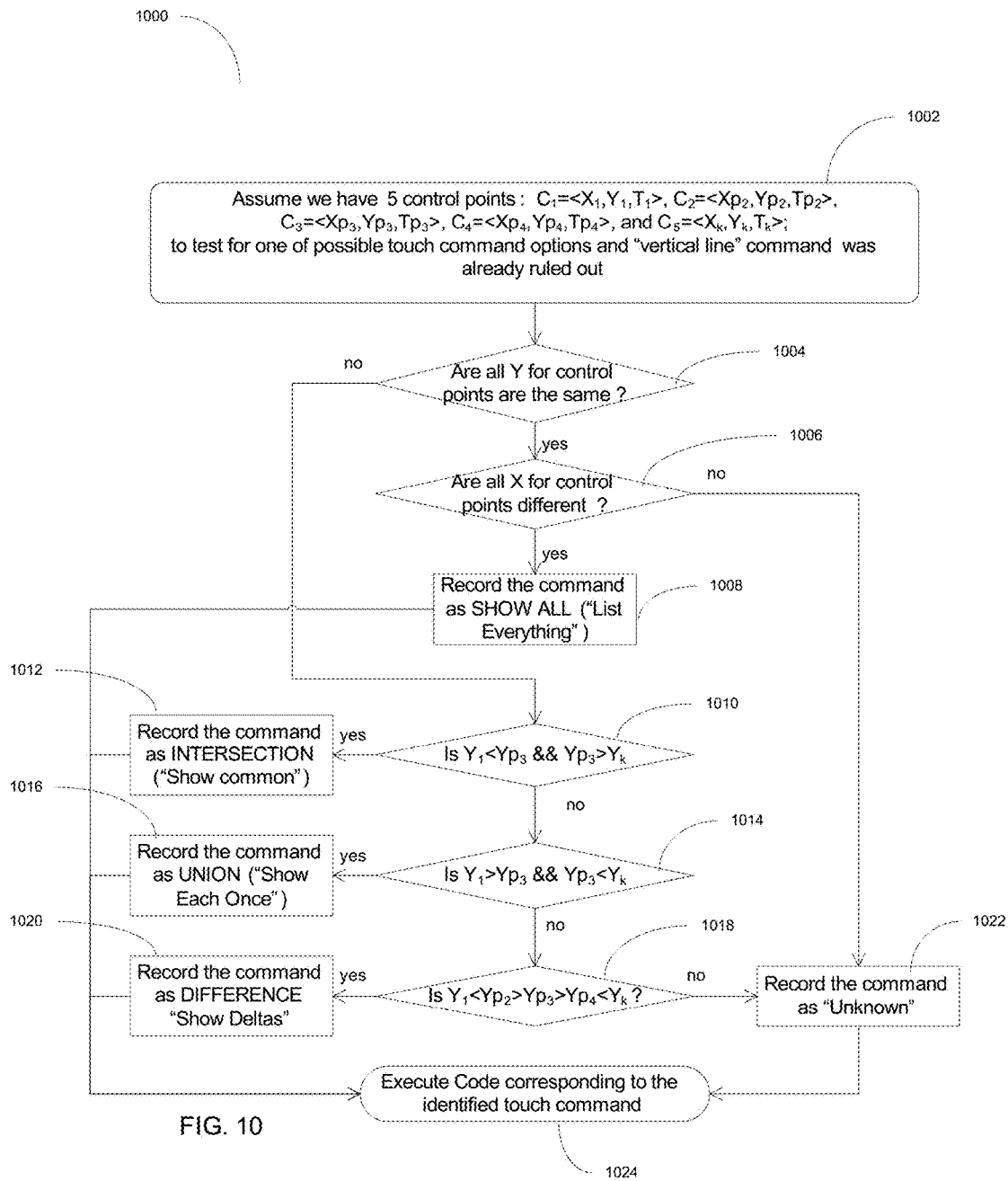
FIG. 10 is a flow chart illustrating the continuation of the process of detection of invented touch commands in accordance certain aspects of the present disclosure.

FIG. 10 is a flow chart 1000 illustrating the continuation of the process 900 of detection of invented touch commands in accordance with certain aspects of the present disclosure. At 1002, it is assumed that there are five control points (form FIG. 9) to test for one of the possible touch command options with "vertical line" command already ruled out. At 1004, if all Y for control points are the same, process proceeds to 1006. At 1006, if all X for control points are different process proceeds to 1008 where the command is recorded as SHOW ALL. If not, the command is recorded as unknown. At 1004, if all Y for control points are not the same, the process proceeds to 1010. At 1010, if the shown condition is fulfilled, command is recorded as INTERSECTION at 1012. At 1014, if the shown condition is fulfilled, the command is recorded as UNION at 1016. At 1018, if the shown condition is fulfilled, the command is recorded as DIFFERENCE at 1020. Finally at 1024, code corresponding to the identified touch command is executed.

Each of the invented touch commands requires specific data processing which was illustrated above. The processing is done by the processing unit 112 (see FIG. 1) and is illustrated in more detail for the "UNION" command in FIG. 11 by the corresponding flow chart. Example used in FIG. 11 assume that the user has selected homes for sale that have 3 bedrooms and 2½ bathroom. The selected tag is schools and the user wants to see their union. In one embodiment, the system creates four empty lists E, M, H, and S, for the elementary, middle, high, and senior high schools, respectively. The system will parse data records for the selected homes one by one and enter each school in the corresponding list unless that school is in the list already. Once all the records are parsed, the system will send instructions to the display to show the results of the "UNION" touch command. Please refer to FIG. 11 for more details of how the algorithm is implemented. Other commands will also be executed by the processing unit 112, and the final output will be sent to the touch display 1131.

Figure 11:
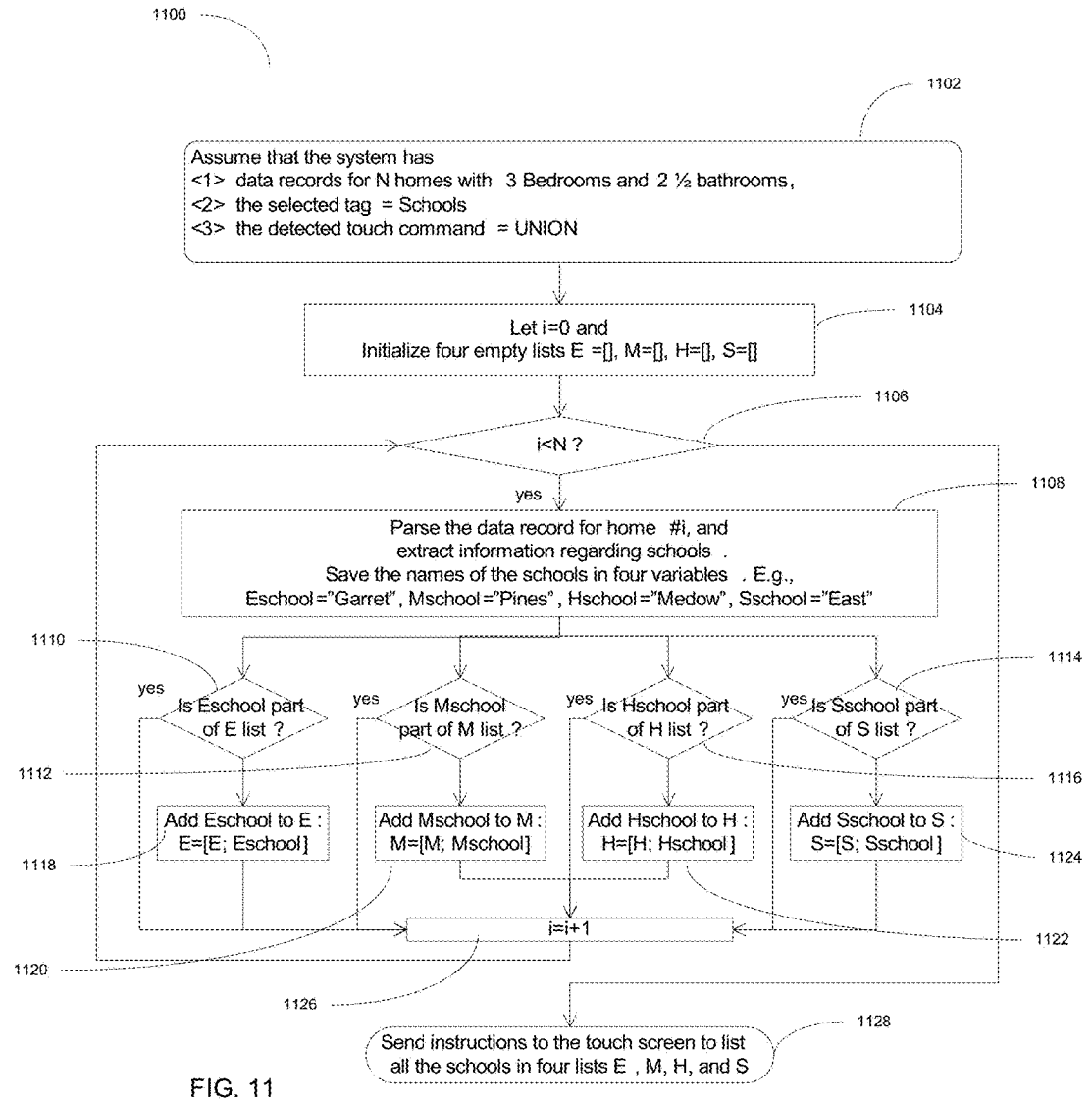
FIG. 11 is a flow chart illustrating the process of the system performing action in response to the UNION touch command in accordance certain aspects of the present disclosure.

FIG. 11 is a flow chart 1100 illustrating the process of the system performing action in response to the UNION touch command in accordance with certain aspects of the present disclosure. At 1102, it is assumed that the system has data records for N homes with 3 bedrooms and 2½ bathrooms, the selected tag is SCHOOLS and the detected touch command is UNION. At 1004, i is initialized to zero and four empty lists are initialized. At 1106 if i<N, the data record for home number i is parsed and information is extracted regarding schools. The names of the schools is saved in four variables as illustrated in the figure. At 1110 if Eschool is part of E list, Eschool is added to list E at 1118. At 1112, if Mschool is part of M list, Mschool is added to list M at 1120. At 1114, if Hschool is part of H list, Hschool is added to list H at 1122. At 1116, if Sschool is part of S list, Sschool is added to list S at 1124. At 1126, i is incremented by one. Finally at 1128, instructions are sent to the touch screen display to list all the schools in four lists E, M, H and S.

The invented touch commands allow natural and intuitive way of comparing data in selected data records. Invoking these commands on a touch screen system supporting data record analysis software saves space, which makes this invention especially valuable for small touch screen devices.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method, comprising:
    detecting at least a first predetermined number of touch events on a touch sensitive device;
    determining at least a second predetermined number of control points based on the detected at least first predetermined number of touch events;
    determining a command based on a change in value of at least one parameter related to at least two of the control points, wherein the determining of the command comprises determining an intended shape drawn on the touch sensitive device based on the change in value of the at least one parameter related to the at least two of the control points, and determining the command based on the determined intended shape;
    processing a first data object and a second data object based on a preselected common attribute tag using the determined command, wherein the preselected common attribute tag is implemented in XML format and comprising time data, location data, and distance data;
    sending a list of attributes recognized by a system, the attributes are used for describing at least the first data object or the second data object to a database by the system; and
    processing the data record to at least a network node of the system, wherein the network node of the system is in communication with the touch sensitive device;
    wherein a measurement signal is compared with a threshold for determining that the touch event is valid.

2. The method of claim 1, wherein detecting each of the first predetermined number of touch events comprises:
    receiving the measurement signal, wherein the measurement signal is associated with the touch event from the touch sensitive device.

3. The method of claim 2, wherein the measurement comprises at least one of:
    at least one position measurement indicating a position of the first touch event;
    at least one time stamp indicating a time of the first touch event; and
    at least one pressure measurement indicating a pressure of the touch on the touch sensitive device.

4. The method of claim 3, wherein the at least one parameter comprises at least one position coordinate of the position measurement.

5. The method of claim 4, further comprising sorting the first predetermined number of touch events based on the time stamp of each of the touch events.

6. The method of claim 1, wherein command is selected from a group consisting of intersection, union, difference, show all, descending sort, and ascending sort.

7. An apparatus, comprising:
    at least one processor configured to:
    detect at least a first predetermined number of touch events on a touch sensitive device;
    determine at least a second predetermined number of control points based on the detected at least first predetermined number of touch events;
    determine a command based on a change in value of at least one parameter related to at least two of the control points, wherein the determining of the command comprises determining an intended shape drawn on the touch sensitive device based on the change in value of the at least one parameter related to the at least two of the control points, and determining the command based on the determined intended shape;

process a first data object and a second data object based on a preselected common attribute tag using the determined command, wherein the preselected common attribute tag is implemented in XML format and comprising time data, location data, and distance data;

send a list of attributes recognized by a system, the attributes are used for describing at least the first data object or the second data object to a database by the system; and process the data records to at least a network node of the system, wherein the network node of the system is in communication with the touch sensitive device;

wherein a measurement signal is compared with a threshold for determining that the touch event is valid; and a memory coupled to the at least one processor.

8. The apparatus of claim 7, wherein detecting each of the first predetermined number of touch events comprises:

receive the measurement signal, wherein the measurement signal is associated with the touch event from the touch sensitive device.

9. The apparatus of claim 8, wherein the measurement comprises at least one of:

at least one position measurement indicating a position of the first touch event;

at least one time stamp indicating a time of the first touch event; and at least one pressure measurement indicating a pressure of the touch on the touch sensitive device.

10. The apparatus of claim 9, wherein the at least one parameter comprises at least one position coordinate of the position measurement.

11. The method of claim 10, wherein the at least one processor is further configured to sort the first predetermined number of touch events based on the time stamp of each of the touch events.

12. The apparatus of claim 7, wherein command is selected from a group consisting of intersection, union, difference, show all, descending sort, and ascending sort.

13. A non-transitory computer-readable medium for determining commands based on a plurality of touch events on a touch sensitive device, the non-transitory computer-readable medium comprising code for:

detecting at least a first predetermined number of touch events on the touch sensitive device;

determining at least a second predetermined number of control points based on the detected at least first predetermined number of touch events;

determining a command based on a change in value of at least one parameter related to at least two of the control points, wherein the determining of the command comprises determining an intended shape drawn on the touch sensitive device based on the change in value of the at least one parameter related to the at least two of the control points, and determining the command based on the determined intended shape;

processing a first data object and a second data object based on a preselected common attribute tag using the determined command, wherein the preselected common attribute tag is implemented in XML format and comprising time data, location data, and distance data;

sending a list of attributes recognized by a system, the attributes are used for describing at least the first data object or the second data object to a database by the system; and processing the data record to at least a network node of the system, wherein the network node of the system is in communication with the touch sensitive device;

wherein a measurement signal is compared with a threshold for determining that the touch event is valid.

14. The non-transitory computer-readable medium of claim 13, wherein detecting each of the first predetermined number of touch events comprises:

receiving the measurement signal, wherein the measurement signal is associated with the touch event from the touch sensitive device.

15. The non-transitory computer-readable medium of claim 14, wherein the measurement comprises at least one of:

at least one position measurement indicating a position of the first touch event;

at least one time stamp indicating a time of the first touch event; and at least one pressure measurement indicating a pressure of the touch on the touch sensitive device.

16. The non-transitory computer-readable medium of claim 15, wherein the at least one parameter comprises at least one position coordinate of the position measurement.

17. The non-transitory computer-readable medium of claim 13, wherein command is selected from a group consisting of intersection, union, difference, show all, descending sort, and ascending sort.

* * * * *